United States Patent
Yeh

(10) Patent No.: US 8,244,963 B2
(45) Date of Patent: Aug. 14, 2012

(54) METHOD FOR GIVING READ COMMANDS AND READING DATA, AND CONTROLLER AND STORAGE SYSTEM USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 379 days.

(21) Appl. No.: 12/568,039

(22) Filed: Sep. 28, 2009

(65) Prior Publication Data

US 2011/0055456 A1 Mar. 3, 2011

(30) Foreign Application Priority Data

Aug. 26, 2009 (TW) ................................ 98128718 A

(51) Int. Cl.
*G06F 12/02* (2006.01)
(52) U.S. Cl. ........................................ 711/103; 711/137
(58) Field of Classification Search .................... None
See application file for complete search history.

(56) References Cited

U.S. PATENT DOCUMENTS

| 2003/0018853 | A1* | 1/2003 | Tokar et al. | 711/118 |
| 2005/0195635 | A1* | 9/2005 | Conley et al. | 365/149 |
| 2005/0223175 | A1* | 10/2005 | Hepner et al. | 711/137 |
| 2006/0224820 | A1* | 10/2006 | Cho et al. | 711/103 |
| 2007/0113000 | A1* | 5/2007 | Murin et al. | 711/103 |
| 2008/0002469 | A1* | 1/2008 | Ishimoto | 365/185.17 |
| 2010/0082890 | A1* | 4/2010 | Heo et al. | 711/103 |
| 2010/0161886 | A1* | 6/2010 | Toelkes et al. | 711/103 |

* cited by examiner

*Primary Examiner* — Kaushikkumar Patel
(74) *Attorney, Agent, or Firm* — J.C. Patents

(57) ABSTRACT

A method for giving a read command to a flash memory chip to read data to be accessed by a host system is provided. The method includes receiving a host read command; determining whether the received host read command follows a last host read command; if yes, giving a cache read command to read data from the flash memory chip; and if no, giving a general read command and the cache read command to read data from the flash memory chip. Accordingly, the method can effectively reduce time needed for executing the host read commands by using the cache read command to combine the host read commands which access continuous physical addresses and pre-read data stored in a next physical address.

22 Claims, 6 Drawing Sheets

METHOD FOR GIVING READ COMMANDS AND READING DATA, AND CONTROLLER AND STORAGE SYSTEM USING THE SAME

CROSS-REFERENCE TO RELATED APPLICATION

This application claims the priority benefit of Taiwan application serial no. 98128718, filed Aug. 26, 2009. The entirety of the above-mentioned patent application is hereby incorporated by reference herein and made a part of specification.

BACKGROUND

1. Field of the Invention

The present invention relates to a method for giving read command to a flash memory and a flash memory controller and a flash memory storage system for using the same.

2. Description of Related Art

Since flash memories are adapted have the characteristics of non-volatile data, power saving, smaller size, and non-mechanical structure, flash memories are suitable for portable appliances, especially portable products powered by batteries. For instance, the solid state drive (SSD) is a storage device using NAND flash memory as a storage medium and is widely used as the major storage device in the notebook computer.

FIG. 1 is a schematic block diagram showing a conventional flash memory storage device. Typically, when the host system 110 is coupled to the flash memory storage device 120 through the connector 122 and is about to read the data stored in the flash memory storage device 120, the procedures for the host system 110 to read the data from the flash memory chip 126 of the flash memory storage device 120 include data uploading, internal data transferring and external data transferring. Specifically, when the host system 110 is about to read the data from the flash memory storage device 120, the flash memory controller 124 gives a general read command to the flash memory chip 126. Meanwhile, the flash memory chip 126 moves the data from the memory cell (i.e. storage region) to the buffer region 132 in the flash memory chip 126 according to the general read command. Thus, the procedure mentioned above is called data uploading. For instance, when the flash memory controller 124 receives a host read command from the host system 110, the flash memory controller 124 gives the flash memory chip 126 a general read command composed of signal streams of "command C1", "physical address" and "command C2", wherein the "command C1" is used to instruct the flash memory chip to prepare for executing the read procedure, the "physical address" is used to indicate the address to be read by the flash memory chip and "command C2" is used to instruct the flash memory chip to move the data from the memory cell 134 to the buffer region 132. Meanwhile, the flash memory chip 126 will move the data from the memory cell 134 to the buffer region 132 according to the "physical address" in the general read command.

After finishing the data uploading, the data temporarily stored in the buffer region 132 is transmitted to the flash memory controller 124 (e.g. the buffer memory equipped in the flash memory controller 124). Thus, the procedure mentioned above is called internal data transferring.

Finally, the flash memory controller 124 transmits the received data to the host system 110 through the connector 122. Thus, the procedure mentioned above is called external data transferring.

Particularly, during the data uploading and the internal data transferring, the flash memory chip 126 is at a busy state after the flash memory controller 124 makes the general read command, and, when the flash memory chip 126 is at the busy state, the flash memory controller 124 cannot give any command to the flash memory chip 126. In the other words, the flash memory controller 124 can give the flash memory chip 126 a next command only after the flash memory chip 126 finishes the procedure of data uploading for moving the data from the memory cell 134 to the buffer region 132 and the procedure of internal data transferring for transmitting the data to the flash memory controller 124 from the buffer region 132. For instance, when two consecutive logic addresses (i.e. two pages) are read according to a host read command of the host system 110, it is necessary for the flash memory controller 124 to give the flash memory chip 126 a first general read command composed of the signal streams of "command C1", "physical address" and "command C2" for performing the data uploading of the data of the first page, and then performing the internal data transferring for transmitting the read data of the first page to the flash memory controller 124, and to give the flash memory chip 124 a second general read command composed of the signal streams of "command C1", "physical address" and "command C2" for performing the data uploading of the data of the second page, and last performing the internal data transferring for transmitting the read data of the second page to the flash memory controller 124. In the other words, even though the data to be read is stored in the consecutive logic addresses, the flash memory controller 124 needs to repeatedly make the general read commands composed of the signal streams of "command C1", "physical address" and "command C2" to read the data from the flash memory chip.

With the development of the transmission technology, the transmission speed is greatly improved, such as the transmission speed of the serial advanced technology attachment (SATA) connector is improved to be 15 gigabit per second and even to be 30 gigabit per second. However, the transmission speed of the aforementioned data uploading and the aforementioned internal data transferring is smaller than that of the connector. The entire storage performance cannot be effectively improved. Therefore, it is the goal of the skilled artisan to decrease the time for executing the host read command.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a method for giving read command capable of decreasing the time for executing the host read command.

The present invention provides a flash memory controller capable of effectively decreasing the time for executing the host read command.

The present invention provides a flash memory storage system capable of effectively decreasing the time for executing the host read command.

The present invention provides a method for reading data capable of decreasing the time for executing the host read command.

The exemplary embodiment of the present invention provides a method for giving a read command to a flash memory chip for reading data to be accessed by a host system. The method comprises providing a flash memory controller and receiving a host command from the host system, wherein the host command is a host read command and the host command comprises a first initial logic address. The method also comprises giving a general read command and at least a cache read command to the flash memory chip by the flash memory controller according to the host command so as to sequentially read a first data, from the flash memory chip, corresponding to the host command from a physical address mapping the first initial logic address and giving at least the cache read command to the flash memory chip by the flash memory controller to read a second data, which is not requested by the host command, from the flash memory chip during at least a part of the first data is transmitted to the flash memory controller, wherein a physical address in the flash memory chip for storing the second data follows a physical address for storing the first data. The method further comprises receiving a next host command from the host system, wherein the next host command comprises a second initial logic address. The method further comprises determining whether the next host command is the host read command and whether the next host command follows the host command, and when the next host command is the host read command and the next host command follows the host command, directly giving at least the cache read command to the flash memory chip by the flash memory controller according to the next host command.

The exemplary embodiment of the present invention provides a flash memory controller for reading data to be accessed by a host system from a flash memory chip. The flash memory controller comprises a microprocessor unit, a flash memory interface unit, a host interface unit, a buffer memory and a memory management unit. The flash memory interface unit is coupled to the microprocessor unit for connecting to the flash memory chip. The host interface unit is coupled to the microprocessor unit for connecting to the host system. The buffer is coupled to the microprocessor unit and is for temporarily storing data. The memory management unit is coupled to the microprocessor unit for receiving a host command from the host system through the host interface unit, wherein the host command is a host read command and the host command comprises a first initial logic address. Moreover, the memory management unit gives a general read command and at least a cache read command to the flash memory chip through the flash memory interface unit according to the host command so as to sequentially read a first data, from the flash memory chip, corresponding to the host command from a physical address mapping the first initial logic address, and the memory management unit gives at least the cache read command to the flash memory chip to read a second data, which is not requested by the host command, from the flash memory chip during at least a part of the first data is transmitted to the buffer memory, wherein a physical address in the flash memory chip for storing the second data follows a physical address for storing the first data. Also, the memory management unit receives a next host command from the host system through the host interface unit, wherein the next host command comprises a second initial logic address. Furthermore, the memory management unit determines whether the next host command is the host read command and whether the next host command follows the host command, and, when the next host command is the host read command and the next host command follows the host command, the memory management unit directly gives at least the cache read command to the flash memory chip through the flash memory interface unit according to the next host command.

The exemplary embodiment of the present invention provides a flash memory storage system. The flash memory storage system comprises a connector, a flash memory chip and a flash memory controller. The connector is coupled to a host system. The flash memory controller is coupled to the connector and the flash memory chip for receiving a host command from the host system through the connector, wherein the host command is a host read command and the host command comprises a first initial logic address. Moreover, the flash memory controller gives a general read command and at least a cache read command to the flash memory chip according to the host command so as to sequentially read a first data, from the flash memory chip, corresponding to the host command from a physical address mapping the first initial logic address and gives at least the cache read command to the flash memory chip to read a second data, which is not requested by the host command, from the flash memory chip during at least a part of the first data is transmitted to the flash memory controller, wherein a physical address in the flash memory chip for storing the second data follows a physical address for storing the first data. Also, the flash memory controller receives a next host command from the host system through the connector, wherein the next host command comprises a second initial logic address. Further, the flash memory controller determines whether the next host command is the host read command and whether the next host command follows the host command, and, when the next host command is the host read command and the next host command follows the host command, the flash memory controller directly gives at least the cache read command to the flash memory chip through the flash memory interface unit according to the next host command.

The exemplary embodiment of the present invention provides a method for reading data to be accessed by a host system from a flash memory chip. The method comprises providing a flash memory controller and receiving a host command from the host system, wherein the host command is a host read command and the host command comprises a first initial logic address. The method also comprises sequentially reading a first data corresponding to the host command from the flash memory chip from a physical address mapping the first initial logic address by the flash memory controller according to the host command, and reading a second data, which is not requested by the host command, from the flash memory chip by the flash memory controller during at least a part of the first data is transmitted to the flash memory controller, wherein a physical address in the flash memory chip for storing the second data follows a physical address for storing the first data. The method further comprises receiving a next host command from the host system, wherein the next host command comprises a second initial logic address. The method comprises determining whether the next host command is the host read command and whether the next host command follows the host command, and, when the next host command is the host read host command and the next host command follows the host command, transmitting the second data to the host system by the flash memory controller.

The exemplary embodiment of the present invention provides a flash memory controller for reading data to be accessed by a host system from a flash memory chip. The flash memory controller comprises a microprocessor unit, a flash memory interface unit, a host interface unit, a buffer memory and a memory management unit. The flash memory interface unit is coupled to the microprocessor unit for connecting to the flash memory chip. The host interface unit is coupled to the microprocessor unit for connecting to the host system. The buffer is coupled to the microprocessor unit and is for temporarily storing data. The memory management unit is coupled to the microprocessor unit for receiving a host command from the host system through the host interface unit, wherein the host command is a host read command and the host command comprises a first initial logic address. Moreover, the memory management unit sequentially reads a first data corresponding to the host command from the flash memory chip from a physical address mapping the first initial logic address through the flash memory interface unit according to the host command, and the memory management unit reads a second data, which is not requested by the host command, from the flash memory chip during at least a part of the first data is transmitted to the buffer memory, wherein a physical address in the flash memory chip for storing the second data follows a physical address for storing the first data. Also, the memory management unit receives a next host command from the host system through the host interface unit, wherein the next host command comprises a second initial logic address. Further, the memory management unit determines whether the next host command is the host read command and whether the next host command follows the host command, and, when the next host command is the host read command and the next host command follows the host command, the memory management unit transmits the second data to the host system through the flash memory interface unit.

The exemplary embodiment of the present invention provides a flash memory storage system. The flash memory storage system comprises a connector, a flash memory chip and a flash memory controller. The connector is coupled to a host system. The flash memory controller is coupled to the connector and the flash memory chip for receiving a host command from the host system through the connector, wherein the host command is a host read command and the host command comprises a first initial logic address. Moreover, the flash memory controller sequentially reads a first data corresponding to the host command from the flash memory chip from a physical address mapping the first initial logic address according to the host command, and the flash memory controller reads a second data, which is not requested by the host command, from the flash memory chip during at least a part of the first data is transmitted to the flash memory controller, wherein a physical address in the flash memory chip for storing the second data follows a physical address for storing the first data. Also, the flash memory controller receives a next host command from the host system through the connector, wherein the next host command comprises a second initial logic address. Further, the flash memory controller determines whether the next host command is the host read command and whether the next host command follows the host command, and, when the next host command is the host read command and the next host command follows the host command, the flash memory controller transmits the second data to the host system through the connector.

According to the above description, the method for giving a read command, the flash memory controller and the flash memory storage system mentioned in the exemplary embodiments of the present invention can effectively decreases the time for executing the host read command and, therefore, the performance of the flash memory storage system can be improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto. In order to make the aforementioned and other features and advantages of the invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
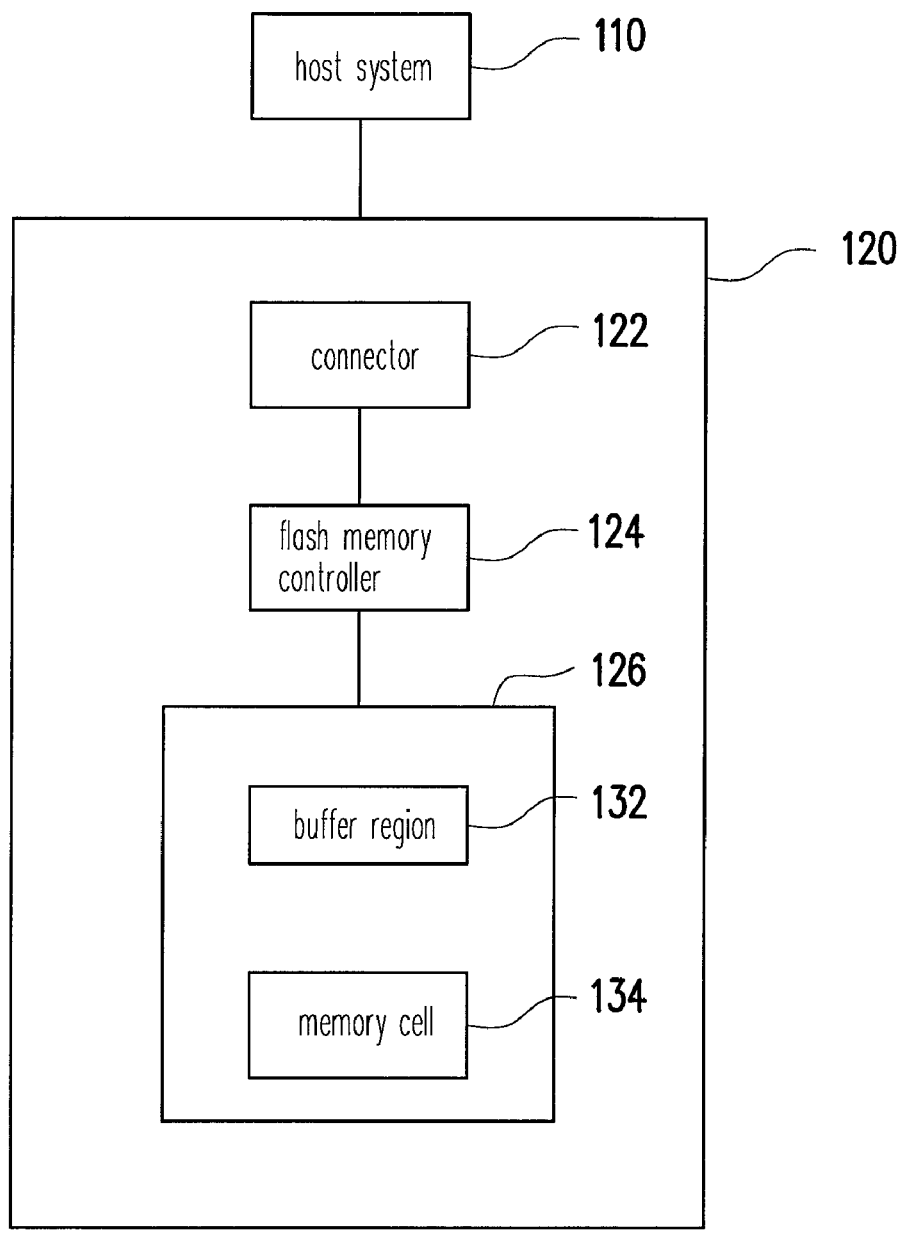
FIG. 1 is a schematic block diagram showing a conventional flash memory storage device.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Flash memory storage system, typically, includes a flash memory chip and a controller (i.e. control circuit). A flash memory storage system is usually used together with a host system for the host system to write data into the flash memory storage system or to read data from the flash memory storage system. Moreover, the other flash memory storage system includes the embedded flash memory and the software, which can be executed on the host system, to be practically used as a controller of the embedded flash memory.

Figure 2A:
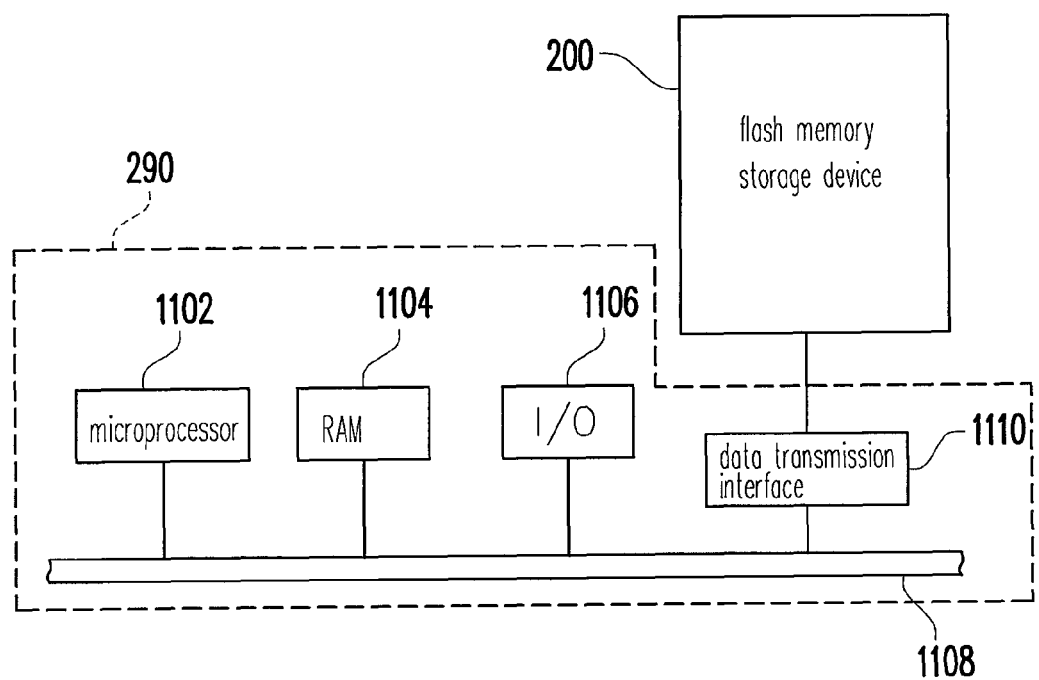
FIG. 2A is a schematic diagram showing a host system using a flash memory storage device according to one embodiment of the present invention.

FIG. 2A is a schematic diagram showing a host system using a flash memory storage device according to one embodiment of the present invention.

As shown in FIG. 2A, the host system 290 generally comprises a microprocessor 1102, a random access memory (RAM) 1104, an Input/Output (I/O) device 1106, a system bus 1108, and a data transmission interface 1110. It is noted that the host 290 may further comprise other elements, such as a display device and a network device.

The host system 290 can be, for example but not limited to, a computer, a digital camera, a video, a communication device, an audio player or a video player. Generally, the host system 290 substantially can be any system capable of storing data.

In the embodiment of the present invention, the flash memory storage device 200 is coupled to the devices of the host system 290 through the data transmission interface 1110. By using the microprocessor 1102, the random access memory (RAM) 1104 and the Input/Output (I/O) device 1106, the data can be write into the flash memory storage device 200 or can be read from the flash memory storage device 200.

Figure 2B:
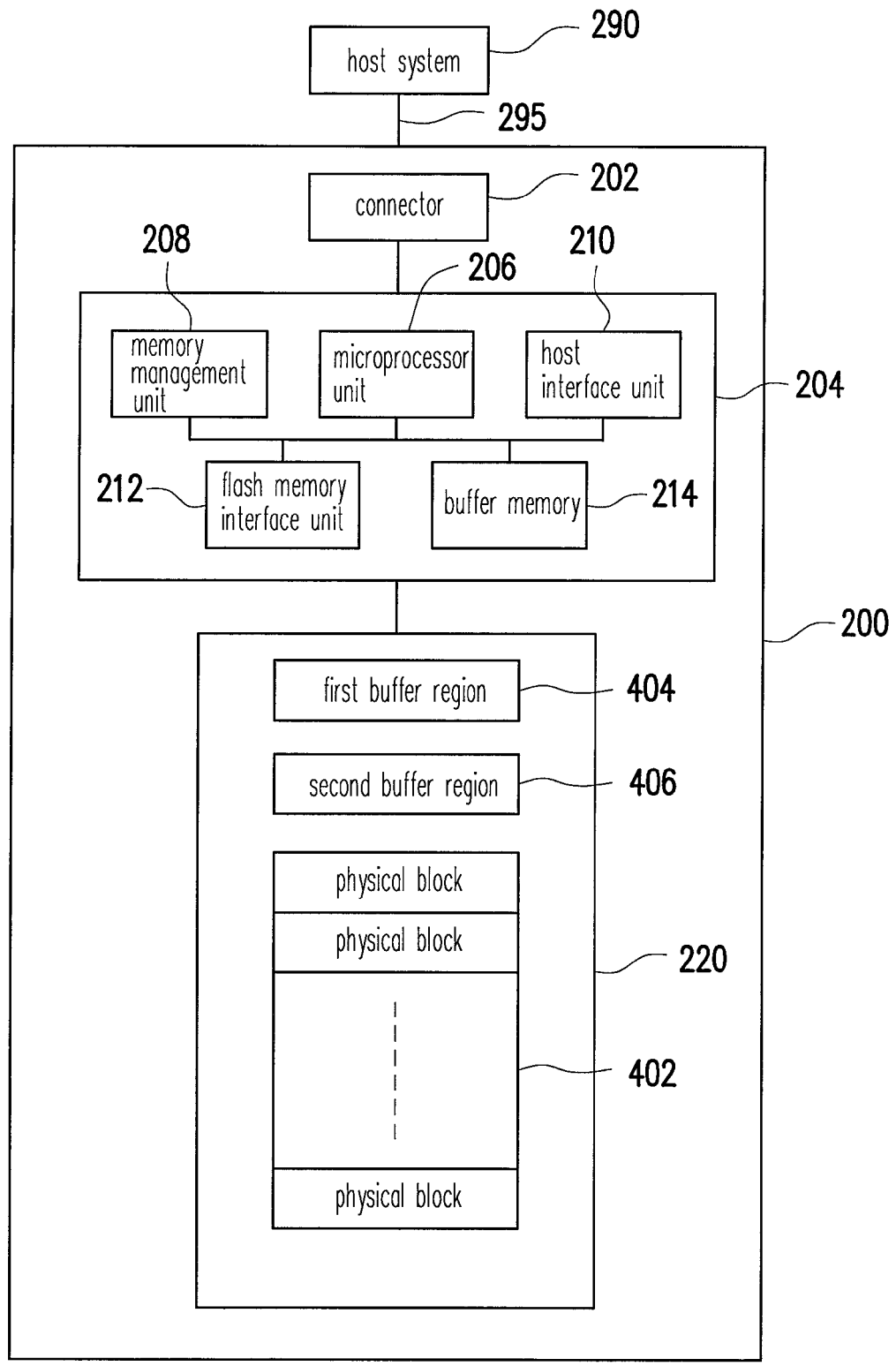
FIG. 2B is a schematic block diagram illustrating a flash memory storage device according to one exemplary embodiment of the present invention.

FIG. 2B is a detailed block diagram showing the flash memory storage device 200 in FIG. 2A.

As shown in FIG. 2B, the flash memory storage device 200 includes a connector 202, a flash memory controller 204, and a flash memory chip 220.

The connector 202 is coupled to the flash memory controller 204 and is connected to the host system 290 through a bus 295. In the present exemplary embodiment, the connector 202 is a serial advanced technology attachment (SATA) connector. However, it should be noticed that the present invention is not limited to the aforementioned description and the connector 110 also can be a universal serial bus (USB) connector, an institute-of-electrical-and-electronic-engineers (IEEE) 1394 connector, a peripheral-component Interconnect-express (PCI Express) connector, a secure digital (SD) interface connector, a memory sick (MS) interface connector, a multi-media-card (MMC) interface connector, a compact flash (CF) interface connector, an integrated-device-electronics (IDE) connector or other suitable type of connectors.

The flash memory controller 204 executes a plurality of logic gates or mechanical commands which are implemented in a hardware form or firmware form and performs the operations of writing, reading and erasing data in the flash memory chip 220 according to the host system 290. The flash memory controller 204 comprises a microprocessor unit 206, a memory management unit 208, a host interface unit 210, a flash memory interface unit 212 and a buffer memory 214.

The microprocessor unit 206 is the host control unit of the flash memory controller 204 for cooperating with the memory management unit 208, the host interface unit 210 and the flash memory interface unit 212 to perform various operations of the flash memory storage device 200.

The memory management unit 208 is coupled to the microprocessor unit 206 for executing the method for giving read command and the block management mechanism according to one exemplary embodiment of the present invention. The operation of the memory management unit 208 is described in detail with the drawings in the following.

In the present exemplary embodiment, the memory management unit 208 is implemented as a firmware form in the flash memory controller 204. For instance, the memory management unit 208 including a plurality of control commands is programmed into a program memory (e.g. read only memory, ROM) and the program memory is embedded into the flash memory controller 204. When the flash memory storage device 200 operates, the plurality of control commands of the memory management unit 208 are executed by the microprocessor unit 206 to finish the method for giving read command and block management mechanism according to the exemplary embodiments of the present invention.

In another exemplary embodiment of the present invention, the control commands of the memory management unit 208 may also be stored in a specific area (for example, a system area, which is used for storing system data only, in the flash memory) of the flash memory chip 220 in a software form. Similarly, when the flash memory storage device 200 operates, the plurality of the control commands of the memory management unit 208 are executed by the microprocessor unit 206. In addition, in another exemplary embodiment of the present invention, the memory management unit 208 can be implemented as a firmware form in the flash memory controller 204.

The host interface unit 210 is coupled to the microprocessor unit 206 and is used to receive and to identify the command and the data transmitted from the host system 290 and to transmit the data to the host system 290. In the other words, the commands and the data from the host system 290 are transmitted to the buffer memory 214 through the host interface unit 210 and the memory management unit 208 transmits the data to the host system 290 through the host interface unit 210. In the present exemplary embodiment, the host interface unit 210 is a SATA interface for being compatible with the connector 202. However, it should be noticed that the present invention is not limited thereto, and the host interface unit 210 may also be a USB interface, an IEEE 1394 interface, a PCI Express interface, an SD interface, an MS interface, an MMC interface, a CF interface, an IDE interface, or other suitable types of interfaces for data transmission.

The flash memory interface unit 212 is coupled to the microprocessor unit 206 for connecting to the flash memory chip 220.

The buffer memory 212 is coupled to the microprocessor unit 206 for temporarily storing the data from the host system 290 or the data from the flash memory chip 220.

Also, although it is not depicted in the present exemplary embodiment, the flash memory controller 204 further comprises an error correcting unit and a power management unit.

The flash memory chip 220 is coupled to the flash memory controller 204 and is used to write data and read data according to the commands of the flash memory controller 204. In the present exemplary embodiment, the flash memory chip 220 is a multi-level cell (MLC) NAND flash memory chip. However, the present invention is not limited thereto and the flash memory chip 220 can also be a single-level cell NAND flash memory chip.

The flash memory chip 220 comprises a storage region 402, a first buffer region 404 and a second buffer region 406.

The storage region 402 comprises a plurality of physical blocks for storing data. Each of the physical blocks is the minimum unit for being erased. That is, each of the physical blocks has a minimum number of memory cells for being erased together. Each of the physical blocks possesses several pages. In the present exemplary embodiment, each of the pages is the minimum unit for being programmed and read. However, in another exemplary embodiment, the minimum unit for programming data into the flash memory chip 220 can be smaller than a sector of the page. The page in one exemplary embodiment of the present invention can be the minimum unit for being written data in or being read data from. Each of the pages usually includes a user data area and a redundancy area. The user data area is for storing the data of a user, and the redundancy area is for storing system data (e.g. an error checking and a correcting code (ECC code)).

It should be noticed that since the memory cells of the flash memory only can be programmed from bit "1" to bit "0", it is necessary to erase the data in the physical block before the data in the physical block is updated. Since the flash memory proceeds the write-in operation by using one page as a unit and the erasing operation by using one physical block as a unit, the physical blocks in the storage region 402 are alternated to store the data. Specifically, the memory management unit 208 logically groups the physical blocks in storage region 204 into a system area, a data area, spare area and a replacement area, wherein the physical blocks grouped into the system area is used for storing relative importance information of the flash memory storage device, and the physical blocks grouped into the replacement area is used for replacing the damaged physical blocks in the data area or the spare area. Therefore, under the general access situation, the host system 290 cannot access the physical blocks in the system area and the replacement area. The physical blocks grouped into the data area is used for storing the data written by the write commands while physical blocks in the spare area are used for replacing the physical blocks in the data area when the write commands are executed. For instance, when the flash memory storage device 200 receives a host write-in command intending to update (or write-in) the data into a specific page of a physical block in the data area, from the host system 290, the memory management unit 208 retrieves a physical block in the spare area and writes valid old data in the physical blocks to be updated and the new data to be written-in into the physical blocks retrieved from the spare area, and then logically associates the physical blocks written with the valid old data and the new data as the data area, and erases as well as associates the original physical blocks to be updated in the data area as spare area. To enable the host system 290 to properly access the physical blocks which store data in an alternate manner, the flash memory storage device 200 provides logic addresses to the host system 290. That is, the flash memory storage system 200 records and updates the relationship between the logic addresses and the physical blocks of the data area in the logical address-physical address mapping table to reflect the alternation of the physical blocks. Accordingly, the host system 290 is only required to perform the write-in operation based on the provided logic addresses and the flash memory storage device 200 will read data from or write data into the physical addresses of the physical blocks according to the logical address-physical address mapping table.

The first buffer region 404 and the second buffer region 406 are used for temporarily storing the data transmitted between the flash memory controller 204 and the storage region 402. As mentioned above, the procedure for the flash memory controller 204 reading data from the flash memory chip 220 comprises the data uploading and the internal data transferring, wherein, in the data uploading, the data to be read is moved to the second buffer region 406 from the storage region 402 and then the data to be read is moved to the first buffer region 404 from the second buffer region 406. As for the internal data transferring, the data to be read is transmitted to the buffer memory 214 from the first buffer region 404. Herein, the first buffer region 404, from which the data is transmitted to the buffer memory 214, can be also called the data cache region and the second buffer region for receiving the data from the storage region 402 can be also called cache buffer region, wherein each of the first buffer region 404 and the second buffer region 406 can temporarily store a data of a page in accordance with the read unit (i.e. page).

In the present exemplary embodiment, the memory management unit 208 gives a general read command and a cache read command to the flash memory chip 220 through the flash memory interface 212 to read the data according to the logic address in the host read command from the host system 290. For instance, the memory management unit 208 uses a general read command composed of the signal streams of "command C1", "physical address" and "command C2" and a cache read command composed of the signal streams of "command C3" to read the data, wherein the memory management unit 208 uses "command C1" to instruct the flash memory chip 220 to prepare for executing the read procedure, uses "physical address" to instruct the flash memory chip 220 where to access the data and uses "command C2" to instruct the flash memory chip 220 to move the data from the storage region 402 to the second buffer region 206 and uses "command C3" to instruct the flash memory chip 220 to move the data from the second buffer region 406 to the first buffer region 404. Particularly, when the host system 290 is about to read the data stored in a plurality of logic addresses, the use of the cache read command can effectively improve the speed of the read operation.

For instance, under the circumstance that the memory management unit 208 is required to read the data in the consecutive pages of the flash memory chip 220 according to the host read command, since the flash memory chip 220 comprises two buffer regions (i.e. the first buffer region 404 and the second buffer region 406), the flash memory chip 220 moves the data of the first page from the second buffer region 406 to the first buffer region 404 by using the cache read command (i.e. "command C3") after the flash memory chip 220 moves the data of the first page from the storage region 402 to the second buffer region 406, and then the second buffer region 406 is available for receiving the data of the second page from the storage region 402 during the data of the first page is transmitted from the first buffer region 404 to the buffer memory 214. In the other words, by using the cache read command, the flash memory chip 220 can still move the data of the following page during the data of the precedent page is transmitted from the flash memory chip 220 to the flash memory controller 204. Therefore, the speed of read operation is improved.

Particularly, in the exemplar that the host system 290 gives several host read commands to the flash memory storage system 200 and the logic addresses to be read and indicated by the host read commands map the consecutive physical addresses, the memory management unit 208 consecutively use cache read commands (i.e. "command C3") to connect (or combine) the host read commands sequentially from the host system 290 without further making the general read command composed of the signal streams of "command C1", "physical address" and "command C2". Hence, the speed of read operation is further improved. It should be noticed that the commands "C1", "C2" and "C3" mentioned in the present exemplary embodiment are only implementation types and different manufactures can define different commands to implement similar functions, such as single command for implementing the functions of the commands "C1" and "C2" mentioned in the present exemplary embodiment and the present invention is not limited thereto.

Figure 3:
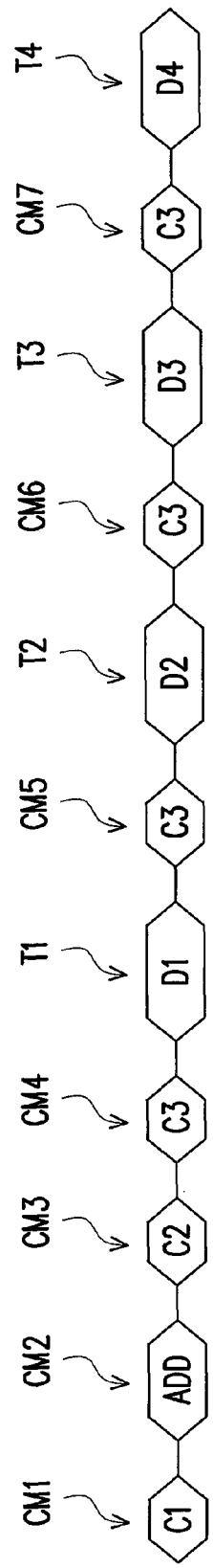
FIG. 3 is a schematic drawing showing an exemplar of a flash memory controller giving a read command according to one exemplary embodiment of the present invention.
Figure 4:
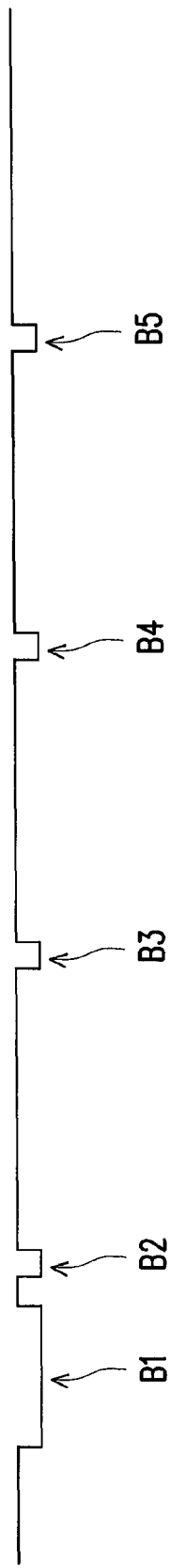
FIG. 4 is an operation timing diagram of the flash memory chip according to commands shown in FIG. 3.

FIG. 3 is a schematic drawing showing an exemplar of a flash memory controller giving a read command according to one exemplary embodiment of the present invention and FIG. 4 is an operation timing diagram of the flash memory chip according to commands shown in FIG. 3. As shown in the exemplars of FIG. 3 and FIG. 4, the memory management unit 208 receives two host read commands sequentially from the host system 290 so as to read the data D1, D2, D3 and D4 stored in the four consecutive physical addresses (i.e. four pages) according to the logic addresses in the host commands. Specifically, the first host read command comprises a logic address to be read and the information of two pages (i.e. data D1 and D2) to be read, wherein the logic address to be read represents a initial logic address (i.e. a first initial logic address) of the data to be read in the first host read command.

Specifically, the second host read command comprises a logic address to be read and the information of two pages (i.e. data D3 and D4) to be read, wherein the logic address to be read represents a initial logic address (i.e. a second initial logic address) of the data to be read in the second host read command.

As shown in FIG. 3 and FIG. 4, after the flash memory controller 204 receives the first host read command from the host system 290, the memory management unit 208 of the flash memory controller 204 gives the flash memory chip 220 a general read command composed of the signal streams of "command C1", "ADD" and "command C2" (such as the commands CM1, CM2 and CM3 shown in FIG. 3) and a cache read command composed of the signal streams of "command C3" (such as the command CM4 shown in FIG. 3) according to the logic address in the host read command, wherein "ADD" represents the initial physical address of the read data. That is, the memory management unit 208, according to the logical address-physical address mapping table, transmits the physical address mapping the first initial logic address to the flash memory chip 220 for reading the data. Meanwhile, the flash memory chip 220 moves the data of the first page from the storage region 402 to the second buffer region 406 according to the command CM3 while the flash memory chip 220 is at a busy state (the busy time B1 shown in FIG. 4). After finishing the command CM3, the flash memory chip 220 executes the cache read command (the command CM4 shown in FIG. 3) to move the data D1 temporality stored in the second buffer region 406 into the first buffer region 404, and to move the data D2 of the second page in the next physical address to the second buffer region 406 after the data D1 is moved from the second buffer region 406 to the first buffer region 404.

Particularly, after moving the data D1 temporarily stored in the second buffer region 406 into the first buffer region 404 (the busy time B2 shown in FIG. 4), the flash memory chip 220 returns to a ready state and transmits the data D1 temporarily stored in the first buffer region 404 into the buffer memory 214 (the internal data transferring T1 shown in FIG. 3). Meanwhile, the internal data transferring of the data D1 and the data uploading of the data D2 are proceeded concurrently.

That is, since the flash memory chip 220 has two buffer regions (i.e. the first buffer region 404 and the second buffer region 406), after the data to be read is moved from the second buffer region 406 to the first buffer region 404, the first buffer region 404 is used for transmitting the data from the storage region 402 to the buffer memory 214 and the second buffer region 406 is used for receiving the data from the storage region 402. Therefore, the internal data transferring of the data D1 and the data uploading of the data D2 can be proceeded concurrently.

Generally, the time (e.g. busy time B2) for the flash memory chip 220 executing the cache read command is shorter than the time for executing the general read command (e.g. busy time B1). For instance, the time for the flash memory chip 220 executing the cache read command is about 1 milliseconds and the time for the executing the general read command is about 50 milliseconds.

Thereafter, when the internal data transferring of the data D1 is finished, the memory management unit 208 gives the flash memory chip 220 the cache read command (such as the command CM5 shown in FIG. 3) to move the data D2 temporarily stored in the second buffer region 406 into the first buffer region 404 (the busy time shown in FIG. 4) and to move the data of the next page in the next physical address to the second buffer region 406 after the data D2 is moved from the second buffer region 406 to the first buffer region 404. Similarly, after moving the data D2 temporarily stored in the second buffer region 406 into the first buffer region 404, the flash memory chip 220 returns to the ready state and transmits the data D2 temporarily stored in the first buffer region 404 into the buffer memory 214 (the internal data transferring T2 shown in FIG. 3). Meanwhile, the internal data transferring of the data D2 and the data uploading of the data of the next page are proceeded concurrently.

After the internal data transferring T2 is finished, the data (i.e. the data D1 and D2) corresponding to the first host read command is transmitted to the host system 290 from the buffer memory 214, that is, the external data transferring. Thereafter, the flash memory controller 204 receives the second host read command from the host system 290, and the memory management unit 208 determines whether the logic address to be accessed by the second host read command follows the logic address accessed by the first host read command.

As mentioned above, in the exemplars of FIG. 3 and FIG. 4, the physical address mapping the logic address to be accessed by the second host read command follows the physical address mapping the logic address accessed by the first host read command. Therefore, the data which the flash memory chip 220 moves from the next page in the storage region 402 according to the command CM5 is the data D3. Hence, the memory management unit 208 gives the flash memory chip 220 the cache read command (such as the command CM6 shown in FIG. 3) to move the data D3 temporarily stored in the second buffer region 406 into the first buffer region 404 and to move the data of the fourth page in the next physical address to the second buffer region 406 after the data D3 is moved from the second buffer region 406 to the first buffer region 404 (the busy time B4 shown in FIG. 4). Similarly, after moving the data D3 temporarily stored in the second buffer region 406 into the first buffer region 404, the flash memory chip 220 returns to the ready state and transmits the data D3 temporarily stored in the first buffer region 404 into the buffer memory 214 (the internal data transferring T3 shown in FIG. 3). Meanwhile, the internal data transferring of the data D3 and the data uploading of the data D4 are proceeded concurrently.

Thereafter, when the internal data transferring of the data D3 is finished, the memory management unit 208 gives the flash memory chip 220 the cache read command (such as the command CM7 shown in FIG. 3) to move the data D4 temporarily stored in the second buffer region 406 into the first buffer region 404 and to move the data of the next page in the next physical address to the second buffer region 406 after the data D4 is moved from the second buffer region 406 to the first buffer region 404. Similarly, after moving the data D4 temporarily stored in the second buffer region 406 into the first buffer region 404, the flash memory chip 220 returns to the ready state and transmits the data D4 temporarily stored in the first buffer region 404 into the buffer memory 214 (the internal data transferring T4 shown in FIG. 3). Meanwhile, the internal data transferring of the data D4 and the data uploading of the data of the next page are proceeded concurrently.

After the internal data transferring T4 is finished, the data (i.e. the data D3 and D4) corresponding to the second host read command is transmitted to the host system 290 from the buffer memory 214.

It should be noticed that when the memory management unit 208 makes commands CM5 and CM7, the memory management unit 208 only instructs the flash memory chip 220 to read the data of the next page in advance and the memory management unit 208 determines whether the host system 290 accesses the data which is read in advance until the memory management unit 208 executes the next host command. Herein, the procedure that the flash memory chip 220 continuously read the next page according to the cache read command is called a pre-read procedure. However, the next host read command from the host system 290 may happen to read this data (e.g. the data D3 shown in FIG. 3). Therefore, when the data which is read in advance happens to be the data to be read by the host system 290, the data which is read in advance can be transmitted to the host system 290 so as to effectively improve the speed of the read operation.

Furthermore, it should be noticed that, as mentioned above, the memory management unit 208 read the data of the next physical address in advance so as to improve the speed of the read operation. However, when a logic block mapping the logic address which is currently accessed is at an open-mother-son-block state of which one logic block maps a plurality of physical blocks, the data in the consecutive physical blocks may not correspond to the consecutive logic addresses. Under this circumstance, it is highly possible that reading the data in the next physical address in advance is meaningless (i.e. the data which is read advance is not the data to be read by the next host read command). Therefore, in another exemplary embodiment of the present invention, before executing the pre-read procedure, the memory management unit 208 determines whether a logic block mapping the logic address which is currently accessed is at the open-mother-son-block state, and, only when the logic block mapping the logic address which is currently accessed is not at the open-mother-son-block state, the memory management unit 208 executes the pre-read procedure.

In the present exemplary embodiment, when the flash memory controller 204 executes the host read command, the memory management unit 208 continuously gives the cache read command to the flash memory chip 220 to read the data of the next page after the flash memory chip 220 finishes the data uploading of the data to be accessed by the host read command. Thereafter, if a next host command from the host system 290 received by the flash memory controller 204 is not the host read command, the memory management unit 208 gives a reset command (e.g. the command composed of the signal streams of "0xFF") to the flash memory chip 220 to terminate the operation of the flash memory chip 220.

Figure 5:
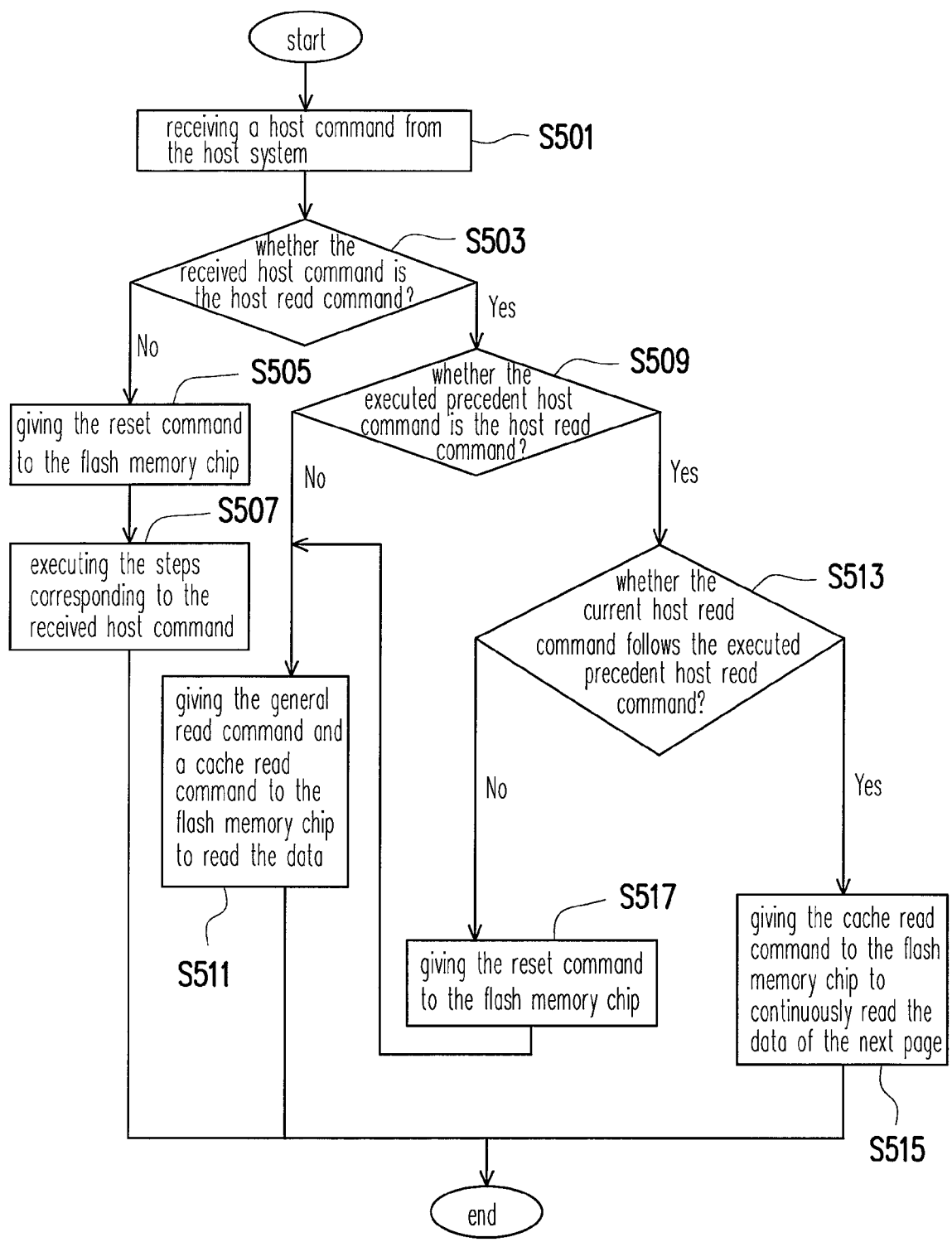
FIG. 5 is a flow chart showing a method for giving a read command according to one exemplary embodiment of the present invention.
Figure 6:
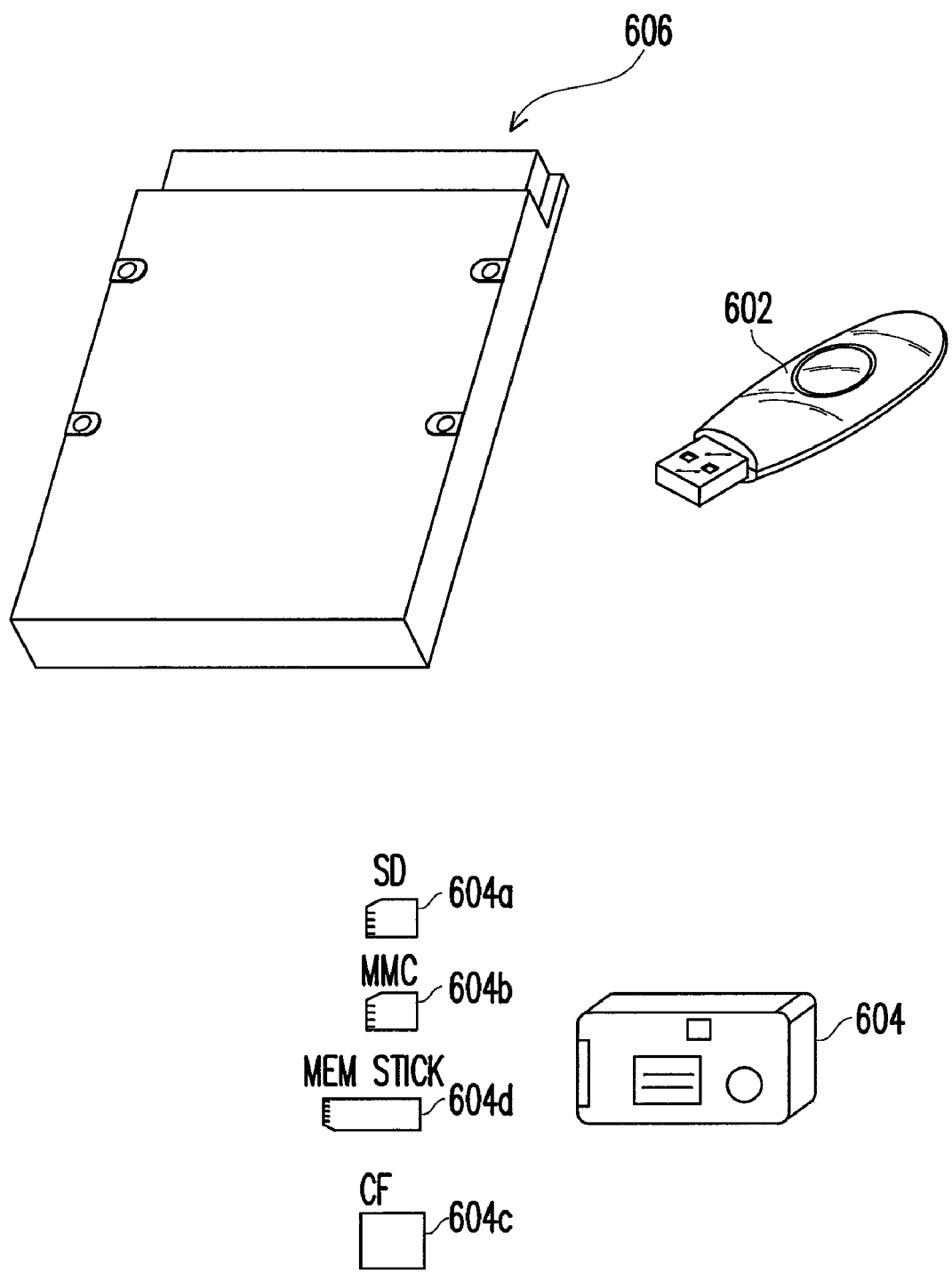
FIG. 6 is a schematic diagram showing a method for giving a read command and a device applying the method for reading data according to one exemplary embodiment of the present invention.

FIG. 5 is a flow chart showing a method for giving a read command according to one exemplary embodiment of the present invention.

As shown in FIG. 5, first, in the step S501, the flash memory storage device 200 receives a host command from the host system 290, and in the step S503, the memory management unit 208 determines whether the received host command is the host read command.

If, in the step S503, it is determined that the received host command is not the host read command, the memory management unit 208, in the step S505, gives the reset command to the flash memory chip 220. Then, in the step S507, the memory management unit 208, according to the host command, executes the corresponding steps and finish the procedure in FIG. 5. In the present exemplary embodiment, FIG. 5 is only used to describe the steps of executing the host read command by the memory management unit 208. The steps for executing other host commands can be understood by the skilled artisan referring to relative technology and the step S507 is not detailed herein.

If, in the step S503, it is determined that the received host command is the host read command, the memory management unit 208, in the step S509, determines whether the executed precedent host command is the host read command.

If, in the step S509, it is determined that the executed precedent host command is not the host read command, the memory management unit 208, in the step S511, gives the general read command (i.e. the command composed of the signal streams of "command C1", "physical address" and "command C2") and a cache read command (i.e. the command composed of the signal streams of "command C3") to the flash memory chip 220 to read the data and finish the procedure in FIG. 5. Specifically, in the step S511, the memory management unit 208 starts to sequentially read the data corresponding to the host read command from the physical address mapping the initial logic address indicated by the received host read command in the flash memory chip 220. Particularly, as mentioned above, the flash memory chip 220 reads the data in the next physical address in advance at the last given cache read command.

If, in the step S509, it is determined that the executed precedent host command is the host read command, the memory management unit 208, in the step S513, determines whether the current host read command follows the executed precedent host read command. For instance, in the step S513, the memory management unit 208 determines whether the physical address mapping the logic address accessed by the current host read command follows the physical address mapping the logic address accessed by the precedent host read command, and when the physical address mapping the logic address accessed by the current host read command follows the physical address mapping the logic address accessed by the precedent host read command, the memory management unit 208 determines whether the current host read command follows the precedent host read command.

If, in the step S513, when it is determines that the current host read command follows the precedent host read command, the memory management unit 208, in the step S515, gives the cache read command to the flash memory chip 220 to continuously read the data of the next page and to finish the procedure in FIG. 5. Specifically, in the step S513, the memory management unit 208 starts to sequentially read the data corresponding to the host read command from the next physical address succeeding to the physical address in which the data is read in advance in the flash memory chip 220. In other words, since the current host read command follows the precedent host read command, the data which is read in advance can be transmitted to the host system 290 and the memory management unit 208 starts to read the data from the next physical address. Similarly, in the step S515, the flash memory chip 220 reads the data in the next physical address in advance at the last given cache read command.

If, in the step S513, it is determines that the current host read command does not follow the precedent host read command, the memory management unit 208, in the step S517, gives the reset command to the flash memory chip 220, and then executes the step S511 to give the general read command and the cache read command to the flash memory chip 220 to read the data.

It should be noticed that, the last cache read commands given in the step S511 and S 515 would lead the flash memory chip 220 reading the data in the next physical address in advance. Therefore, in another exemplary embodiment of the present invention, whether the current host read command follows the precedent host read command can be determined by whether the physical address mapping the logical address accessed by the current host read command is the same as the physical address in which the data is read in advance. When the physical address mapping the logic address accessed by the current host read command is the same as the physical address in which the data is read in advance, the memory management unit determines that the current host read command follows the precedent host read command.

The method for giving read command and the method for reading data are used with the flash memory according to the exemplary embodiments of the present invention. Hence, the method for giving read command and the method for reading data can be applied to various flash memories to be storage medium devices. In the other words, the flash memory storage device 200 can be an SD card 604a, an MMC card 604b, a CF card 604c and a memory stick 604d or solid state drive (SSD) 606 used in a flash disk 602, a digital camera (a camcorder) 604.

According to the above descriptions, the method for giving read command of the exemplary embodiments of the present invention uses the cache read command to combine the plurality of host read commands for intending to read consecutive logic addresses. Hence, the time for executing the host read command can be decreased. Furthermore, by using the pre-read procedure to read the data of the next page in advance, the time for executing the host read command can be further decreased.

The previously described exemplary embodiments of the present invention have many advantages, including decreasing the time for executing the host read command, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for giving a read command to a flash memory chip for reading data to be accessed by a host system, the method comprising:
   providing a flash memory controller;
   receiving a host command from the host system, wherein the host command is a host read command and the host command comprises a first initial logic address;
   giving a general read command and at least a cache read command to the flash memory chip by the flash memory controller according to the host command so as to sequentially read a first data, from the flash memory chip, corresponding to the host command from a physical address mapping the first initial logic address;
   determining whether a logic block mapping the first initial logic address is at an open-mother-son-block state;
   when the logic block mapping the first initial logic address is not at the open-mother-son-block state, giving at least the cache read command to the flash memory chip by the flash memory controller to read a second data, which is not requested by the host command, from the flash memory chip during at least a part of the first data is transmitted to the flash memory controller, wherein a physical address in the flash memory chip for storing the second data follows a physical address for storing the first data;
   receiving a next host command from the host system, wherein the next host command comprises a second initial logic address;
   determining whether the next host command is the host read command and whether the next host command follows the host command; and
   when the next host command is the host read command and the next host command follows the host command, directly giving at least the cache read command to the flash memory chip by the flash memory controller according to the next host command.

2. The method of claim 1, wherein, when the next host command is the host read command and the next host command does not follow the host command, the flash memory controller gives a reset command to the flash memory chip and then gives the general read command and at least the cache read command to the flash memory chip to sequentially read a third data, from the flash memory chip, corresponding to the next host command from a physical address mapping the second initial logic address.

3. The method of claim 1, wherein, when the next host command is not the host read command, the flash memory controller gives a reset command to the flash memory chip.

4. The method of claim 1, wherein determining whether the next host command follows the host command comprises:
   determining whether a physical address mapping the second initial logic address follows the physical address for storing the first data; and
   when the physical address mapping the second logic address follows the physical address for storing the first data, determining the next host command follows the host command.

5. The method of claim 1, wherein determining whether the next host command follows the host command comprises:
   determining whether a physical address mapping the second initial logic address is the same as the physical address for storing the second data; and
   when the physical address mapping the second logic address is the same as the physical address for storing the second data, determining the next host command follows the host command.

6. A flash memory controller for reading data to be accessed by a host system from a flash memory chip, the flash memory controller comprising:
   a microprocessor unit;
   a flash memory interface unit coupled to the microprocessor unit for connecting to the flash memory chip;
   a host interface unit coupled to the microprocessor unit for connecting to the host system;
   a buffer memory coupled to the microprocessor unit; and
   a memory management unit coupled to the microprocessor unit for receiving a host command from the host system through the host interface unit, wherein the host command is a host read command and the host command comprises a first initial logic address,
   wherein the memory management unit, according to the host command, gives a general read command and at least a cache read command to the flash memory chip through the flash memory interface unit so as to sequentially read a first data, from the flash memory chip, corresponding to the host command from a physical address mapping the first initial logic address,
   wherein the memory management unit determines whether a logic block mapping the first initial logic address is at an open-mother-son-block state, and when the logic block mapping the first initial logic address is not at the open-mother-son-block state, the memory management unit gives at least the cache read command to the flash memory chip to read a second data, which is not requested by the host command, from the flash memory chip during at least a part of the first data is transmitted to the buffer memory, wherein a physical address in the flash memory chip for storing the second data follows a physical address for storing the first data, wherein the memory management unit receives a next host command from the host system through the host interface unit, wherein the next host command comprises a second initial logic address, wherein the memory management unit determines whether the next host command is the host read command and whether the next host command follows the host command, and, when the next host command is the host read command and the next host command follows the host command, the memory management unit directly gives at least the cache read command to the flash memory chip through the flash memory interface unit according to the next host command.

7. The flash memory controller of claim 6, wherein, when the next host command is the host read command and the next host command does not follow the host command, the memory management unit gives a reset command to the flash memory chip and then gives the general read command and at least the cache read command to the flash memory chip to sequentially read a third data, from the flash memory chip, corresponding to the next host command from a physical address mapping the second initial logic address.

8. The flash memory controller of claim 6, wherein, when the next host command is not the host read command, the memory management unit gives a reset command to the flash memory chip.

9. The flash memory controller of claim 6, wherein the memory management unit determines whether a physical address mapping the second initial logic address follows the physical address for storing the first data, wherein, when the physical address mapping the second logic address follows the physical address for storing the first data, the memory management unit determines the next host command follows the host command.

10. The flash memory controller of claim 6, wherein the memory management unit determines whether a physical address mapping the second initial logic address is the same as the physical address for storing the second data, wherein, when a physical address mapping the second logic address is the same as a physical address for storing the second data, the memory management unit determines the next host command follows the host command.

11. A flash memory storage system, comprising:
a connector coupled to a host system;
a flash memory chip; and
a flash memory controller coupled to the connector and the flash memory chip for receiving a host command from the host system through the connector, wherein the host command is a host read command and the host command comprises a first initial logic address, wherein the flash memory controller gives a general read command and at least a cache read command to the flash memory chip according to the host command so as to sequentially read a first data, from the flash memory chip, corresponding to the host command from a physical address mapping the first initial logic address, wherein the flash memory controller determines whether a logic block mapping the first initial logic address is at an open-mother-son-block state, and when the logic block mapping the first initial logic address is not at the open-mother-son-block state, the flash memory controller gives at least the cache read command to the flash memory chip to read a second data, which is not requested by the host command, from the flash memory chip during at least a part of the first data is transmitted to the flash memory controller, wherein a physical address in the flash memory chip for storing the second data follows a physical address for storing the first data wherein the flash memory controller receives a next host command from the host system through the connector, wherein the next host command comprises a second initial logic address, wherein the flash memory controller determines whether the next host command is the host read command and whether the next host command follows the host command, and, when the next host command is the host read command and the next host command follows the host command, the flash memory controller directly gives at least the cache read command to the flash memory chip through the flash memory interface unit according to the next host command.

12. The flash memory storage system of claim 11, wherein, when the next host command is the host read command and the next host command does not follow the host command, the flash memory controller gives a reset command to the flash memory chip and then gives the general read command and at least the cache read command to the flash memory chip to sequentially read a third data, from the flash memory chip, corresponding to the next host command from a physical address mapping the second initial logic address.

13. The flash memory storage system of claim 11, wherein, when the next host command is not the host read command, the flash memory controller gives a reset command to the flash memory chip.

14. The flash memory storage system of claim 11, wherein the flash memory controller determines whether a physical address mapping the second initial logic address follows the physical address for storing the first data, wherein, when the physical address mapping the second initial logic address follows the physical address for storing the first data, the flash memory controller determines the next host command follows the host command.

15. A method for reading data to be accessed by a host system from a flash memory chip, the method comprising:
providing a flash memory controller;
receiving a host command from the host system, wherein the host command is a host read command and the host command comprises a first initial logic address;
sequentially reading a first data corresponding to the host command from the flash memory chip from a physical address mapping the first initial logic address by the flash memory controller according to the host command;
determining whether a logic block mapping the first initial logic address is mapped to a plurality of physical blocks; and
when the logic block mapping the first initial logic address is not mapped to the plurality of physical blocks, reading a second data, which is not requested by the host command, from the flash memory chip by the flash memory controller during at least a part of the first data is transmitted to the flash memory controller, wherein a physical address in the flash memory chip for storing the second data follows a physical address for storing the first data.

16. The method of claim 15, further comprising:
receiving a next host command from the host system, wherein the next host command comprises a second initial logic address;
determining whether the next host command is the host read command and whether the next host command follows the host command; and when the next host command is the host read command and the next host command follows the host command, transmitting the second data to the host system by the flash memory controller.

17. The method of claim 16, wherein determining whether the next host command follows the host command comprises:
determining whether a physical address mapping the second initial logic address follows the physical address for storing the first data; and
when the physical address mapping the second logic address follows the physical address for storing the first data, determining the next host command follows the host command.

18. The method of claim 16, wherein determining whether the next host command follows the host command comprises:
determining whether a physical address mapping the second initial logic address is the same as the physical address for storing the second data; and
when the physical address mapping the second logic address is the same as the physical address for storing the second data, determining the next host command follows the host command.

19. A flash memory controller for reading data to be accessed by a host system from a flash memory chip, the flash memory controller comprising:
a microprocessor unit;
a flash memory interface unit coupled to the microprocessor unit for connecting to the flash memory chip;
a host interface unit coupled to the microprocessor unit for connecting to the host system;
a buffer memory coupled to the microprocessor unit; and
a memory management unit coupled to the microprocessor unit for receiving a host command from the host system through the host interface unit, wherein the host command is a host read command and the host command comprises a first initial logic address,
wherein the memory management unit sequentially reads a first data corresponding to the host command from the flash memory chip from a physical address mapping the first initial logic address through the flash memory interface unit according to the host command; and
wherein memory management unit determines whether a logic block mapping the first initial logic address is mapped to a plurality of physical blocks, and when the logic block mapping the first initial logic address is not mapped to the plurality of physical blocks, the memory management unit reads a second data, which is not requested by the host command, from the flash memory chip during at least a part of the first data is transmitted to the buffer memory, wherein a physical address in the flash memory chip for storing the second data follows a physical address for storing the first data.

20. The flash memory controller of claim 19,
wherein the memory management unit receives a next host command from the host system through the host interface unit, wherein the next host command comprises a second initial logic address,
wherein the memory management unit determines whether the next host command is the host read command and whether the next host command follows the host command, and, when the next host command is the host read command and the next host command follows the host command, the memory management unit transmits the second data to the host system through the flash memory interface unit.

21. A flash memory storage system, comprising:
a connector coupled to a host system;
a flash memory chip; and
a flash memory controller coupled to the connector and the flash memory chip for receiving a host command from the host system through the connector, wherein the host command is a host read command and the host command comprises a first initial logic address,
wherein the flash memory controller sequentially reads a first data corresponding to the host command from the flash memory chip from a physical address mapping the first initial logic address according to the host command,
wherein the flash memory controller determines whether a logic block mapping the first initial logic address is mapped to a plurality of physical blocks, and when the logic block mapping the first initial logic address is not mapped to the plurality of physical blocks, the flash memory controller reads a second data, which is not requested by the host command, from the flash memory chip during at least a part of the first data is transmitted to the flash memory controller, wherein a physical address in the flash memory chip for storing the second data follows the physical address for storing the first data.

22. The flash memory storage system of claim 21,
wherein the flash memory controller receives a next host command from the host system through the connector, wherein the next host command comprises a second initial logic address,
wherein the flash memory controller determines whether the next host command is the host read command and whether the next host command follows the host command, and, when the next host command is the host read command and the next host command follows the host command, the flash memory controller transmits the second data to the host system through the connector.

* * * * *